United States Patent [19]
Richards et al.

[11] 3,916,605
[45] Nov. 4, 1975

[54] FORAGE HARVESTER WITH IMPROVED FLOW PATTERN FOR CUT MATERIAL

[75] Inventors: Gerald F. Richards, Celina; Nathan L. Blake, Coldwater, both of Ohio

[73] Assignee: Avco Corporation, Coldwater, Ohio

[22] Filed: Feb. 5, 1974

[21] Appl. No.: 440,155

[52] U.S. Cl. ............... 56/13.3; 56/13.9; 241/101.7
[51] Int. Cl.² ........................................ A01D 49/00
[58] Field of Search ............... 56/DIG. 1, 13.3, 16.6, 56/13.5–13.9; 241/222, 101.7

[56] References Cited
UNITED STATES PATENTS

| | | | |
|---|---|---|---|
| 2,439,259 | 4/1948 | McCormack | 56/DIG. 1 |
| 3,377,785 | 4/1968 | Kessler | 56/13.3 X |
| 3,731,569 | 5/1973 | Quanrud | 241/101.7 X |

Primary Examiner—J. N. Eskovitz
Attorney, Agent, or Firm—Charles M. Hogan

[57] ABSTRACT

A forage harvester comprising a transverse rotary cutter having helical cutter blades for cutting harvested material. A fore and aft extending auger carries the cut material to a blower for discharge into a storage wagon. The hand of the helical cutter blades is selected so that material is thrown toward the feed side of the auger, thus improving the flow of material. The auger is positioned within a housing having a cover sloping gradually downward from the rotary cutter to the aft end of the auger.

6 Claims, 5 Drawing Figures

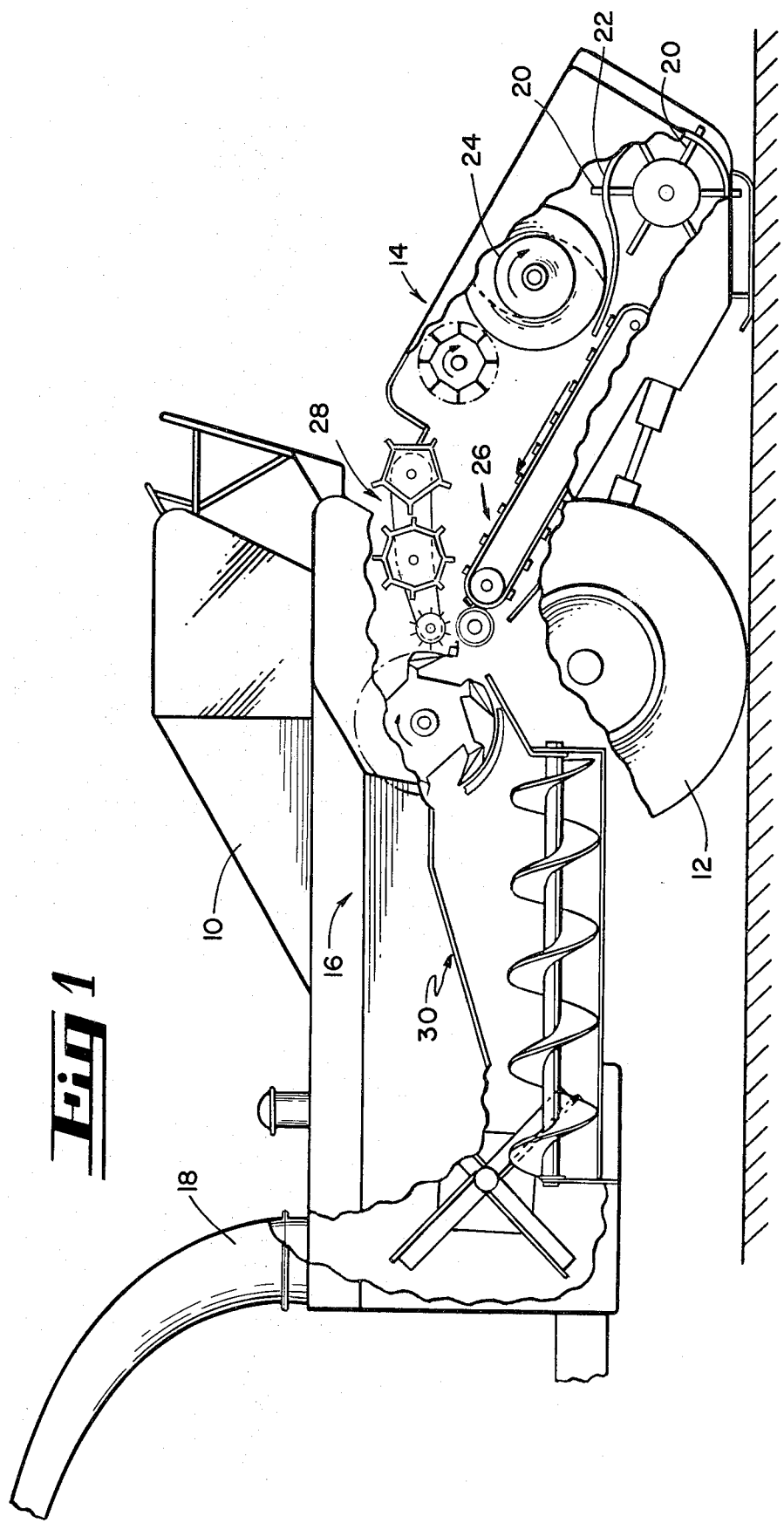

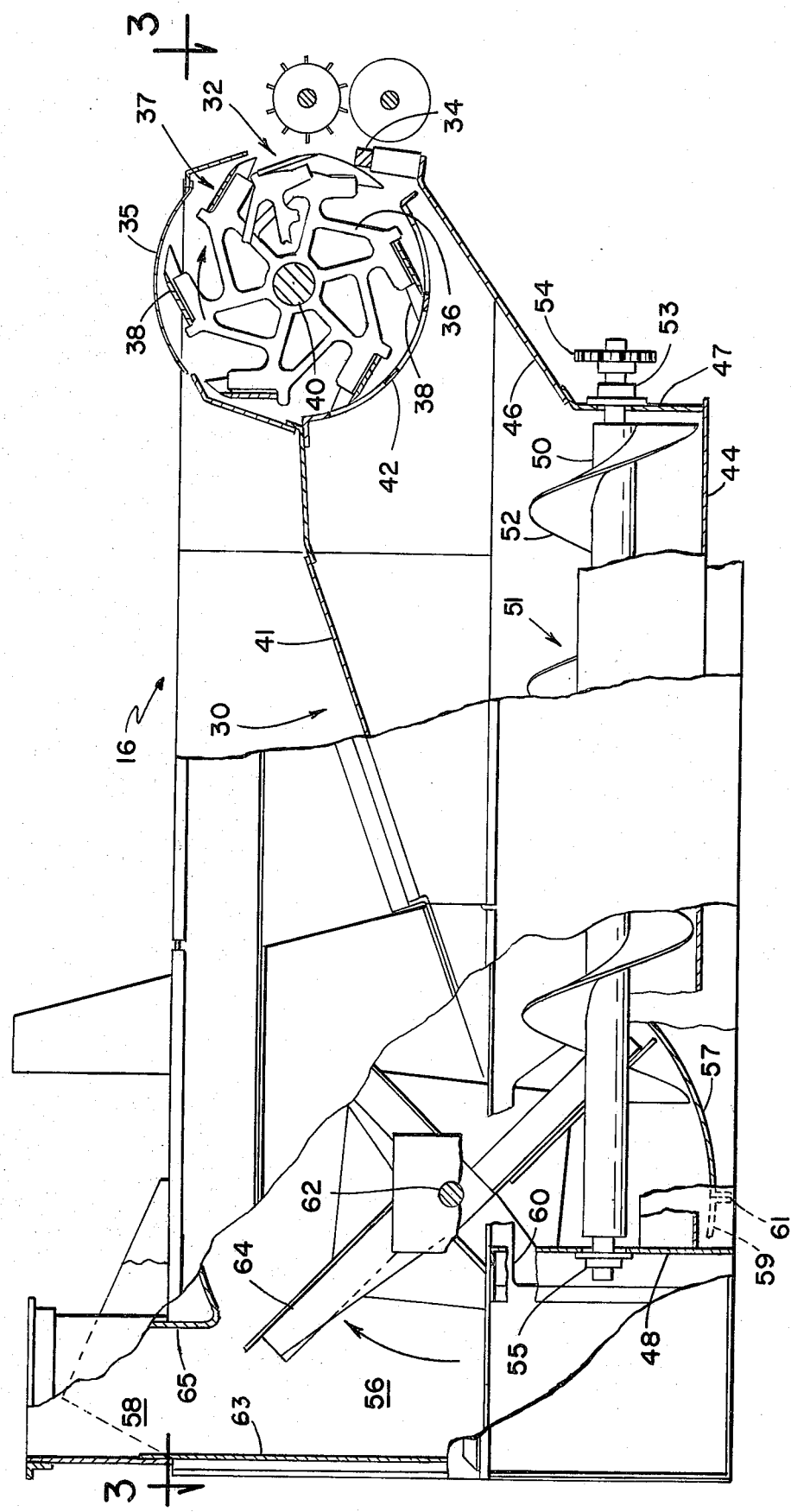

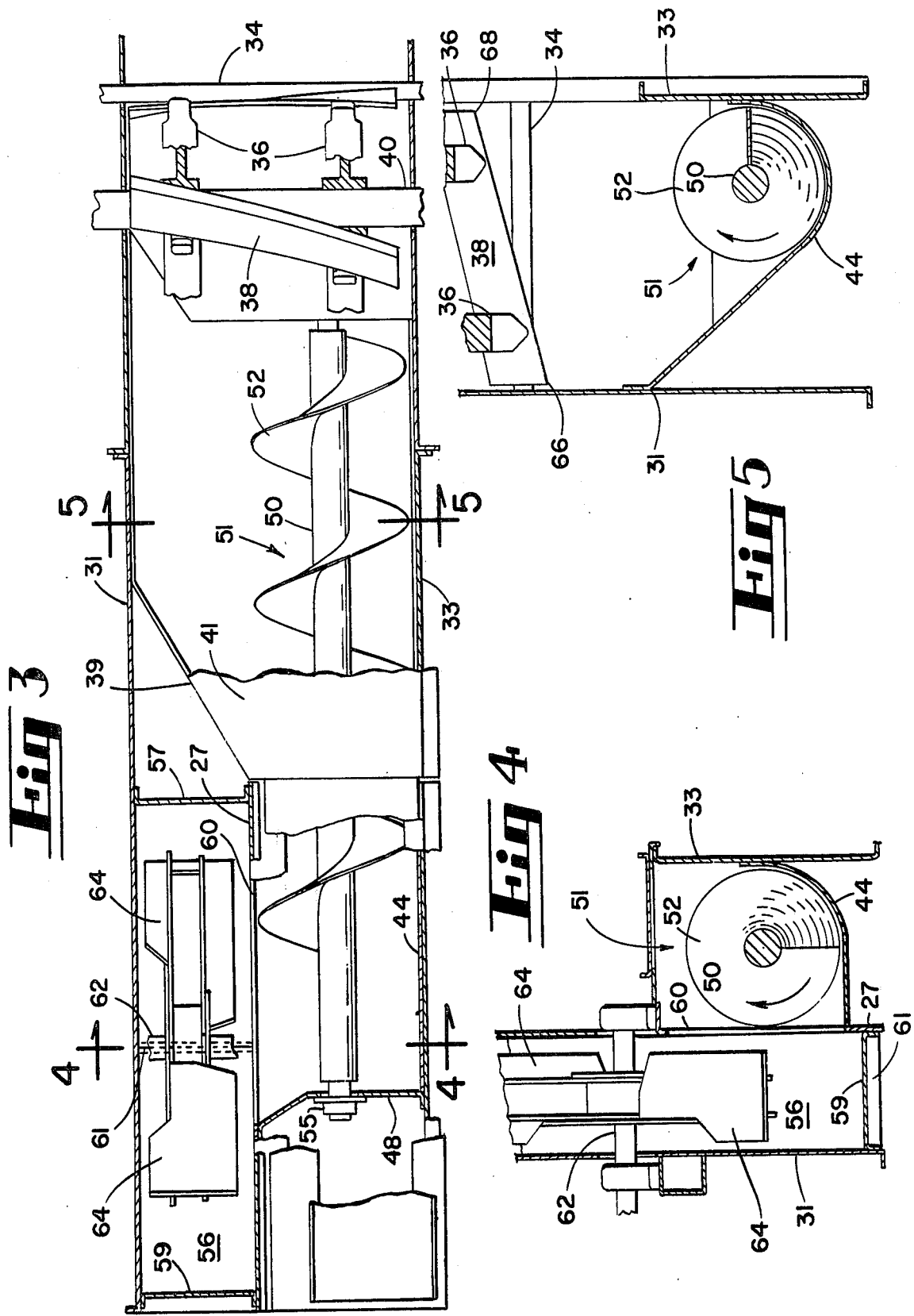

FORAGE HARVESTER WITH IMPROVED FLOW PATTERN FOR CUT MATERIAL

The present invention relates to forage harvesters and more particularly to apparatus for cutting harvested material to make silage.

The well-known agricultural practice of ensilage consists of cutting either green or mature crops into fine particles and storing them in a silo where they undergo an acid fermentation to give them an agreeable flavor and to prevent spoilage. By this process the crop is converted into an effective livestock feed. An essential piece of equipment for this practice is a forage harvester which cuts crops into small particles after they have been harvested by a field-going unit. Typically, the forage harvester uses a rotary cutter having helical blades which cooperate with a fixed cutter bar to cut material as it passes across the fixed cutter bar. An additional perforated recutter screen may be used to reduce the size even further. From there the material is transferred to an aft discharge end by an auger extending at right angles to the axis of the rotary cutter. One of the problems experienced in the past with this general type of forage harvester has been in the flow pattern of cut material from the rotary cutter to the transfer auger. Designs of some prior units have permitted material to accumulate unevenly along the auger and thus cause clogging.

The above problem is solved by apparatus for cutting and discharging material for ensilage. The apparatus comprises a housing having a rotary cutter with helical cutter blades journaled for rotation about a lateral axis so that the blades cooperate with a fixed cutter bar to cut material passing into the housing. An auger beneath and extending generally fore and aft receives cut material and passes the material to the aft end of the housing for discharge. The hand of the helical cutter blades and the direction of rotation of the auger have a given relationship to one another so that material passing from the cutter blades is distributed toward the feed side of the auger.

The above and other related features of the present invention will be apparent from a reading of the following description of the disclosure shown in the accompanying drawings and the novelty thereof pointed out in the appended claims.

In the drawings:

FIG. 1 shows a side elevational view of a forage harvester, together with a pick-up mechanism and a self-propelled power unit with which it may be used;

FIG. 2 is a more detailed and enlarged side view of the forage harvester of FIG. 1;

FIG. 3 is a top view of the forage harvester of FIG. 2 taken on line 3—3 of FIG. 2;

FIG. 4 is a cross-sectional view of the forage harvester of FIG. 2 taken on line 4—4 of FIG. 3; and FIG. 5 is another cross-sectional view of the forage harvester of FIG. 2 taken on line 5—5 of FIG. 3.

FIG. 1 illustrates a self-propelled power unit 10 guided for movement along the ground by traction wheels 12 and steerable wheels (not shown). A pick-up attachment 14 is mounted from and extends forward from the power unit 10 for picking up field crops and passing them to a forage harvester 16 where the crops are cut and discharged from a curved blower spout 18 to a suitable storage wagon or truck.

The pick-up attachment 14 is particularly used for hay and similar materials. It should be apparent, however, that other types of pick-up units may be used for other crops. The pick-up attachment 14 consists of rotating teeth 20 received in a slotted forward shield 22 for picking up hay and sweeping it over its top side. An auger assembly 24 pushes the cut hay toward the center of the pick-up unit where the hay is elevated and passed aft by a suitable conveyor 26. A series of feed rolls 28 are driven to positively pass harvested material into the forward end of the forage harvester 16.

As shown particularly in FIGS. 2–5, the forage harvester 16 comprises an outer housing, generally indicated at 30, and having side walls 31 and 33. A forward opening 32 is defined along its top edge by a cutter housing 35 and along its bottom edge by a fixed transversely extending shear bar 34. A rotary cutter 37 consisting of end frames 36 and helical cutter blades 38 is mounted on a shaft 40 rotatably driven about an axis generally parallel to the edge of shear bar 34. If desired, a perforated recutter screen 42 may be used to further reduce the size of the material. From there the material passes into an auger trough 44 extending between side walls 31 and 33 of housing 30 from a forward ramp 47 and end plate 46 adjacent the rotary cutter 37 to an aft end plate 48 adjacent the aft end of housing 30. An intermediate wall section 39 extends from wall 31 to a wall section 27 intermediate walls 31 and 33. An upper cover 41 extends between walls 39 and 33. Cover 41 slopes downward gradually from rotary cutter cover 35 to a point adjacent the aft end of housing 30. An auger 51 comprising a central shaft 50 with auger flights 52 is journaled in end plates 46 and 48 by bearings 53 and 55, respectively. A sprocket 54 on shaft 50 permits the auger to be driven by means of a chain (not shown).

A generally cylindrical blower chamber housing 56 is formed by curved sheet elements 57 and 59 mounted between walls 31 and 27, and joined together at a lower flange junction 61 by suitable fasteners (not shown). Sheet element 59 has a straight section 63 and element 57 has a bent section 65 cooperating with one another to form an upward tangentially directed outlet 58. An opening 60 in wall 27 connects the auger housing 44 to the interior of chamber 56. A paddle wheel assembly is journaled for rotation in chamber 56 and comprises a driven shaft 62 mounting a series of radially extending paddles 64. These paddles 64 sweep through chamber 56 and sweep material from opening 60 through the outlet 58 to blower spout 18 (FIG. 1).

In accordance with the invention, the hand of the rotary cutter blades 38 and the direction of rotation of auger 50 are selected so that material discharged from the cutter blades is directed toward the feed side of the auger. As shown particularly in FIG. 5, the auger 51 rotates in a clockwise direction (indicated by an arrow) as viewed from the aft end of the housing 30. The auger flights 52 have a right hand so that the feed side of the auger is to the right of shaft 50. The hand of cutter blades 38 is selected so that the left edge 66 leads the right edge 68 past the fixed shear bar 34, as viewed from the aft end of housing 30. This causes material to be discharged in a direction generally perpendicular to the cutting edge of the knives 38. Thus, as we see in FIG. 5, cut material tends to be directed toward the right side of shaft 50 along wall 33 or, in other words, the feed side of the auger 51. This greatly improves the flow into the transfer auger 51 and substantially minimizes if not eliminates clogging. Since the auger housing has the upper cover 41 sloping gradually from the rotary cutter housing 35 aft and downward to a point adjacent opening 60, it insures that there are no sharp corners that can clog flow of material.

The use of side walls 31, 33 and intermediate wall 39 to define in part several of the flow paths for cut material greatly simplifies construction of the forage harvester. For example, wall sections 39 and 27 define part of the flow for material in auger 51 and also define part of chamber 56. This results in economy of manufacture and ease of maintenance.

While a specific embodiment of the present invention has been described in connection with a particular type of pick-up attachment, it should be apparent to those skilled in the art that it may be employed in other forms without departing from its spirit and scope.

Having thus described the invention what is claimed as novel and desired to be secured by Letters Patent of the United States is:

1. Apparatus for cutting and discharging material for ensilage, said apparatus comprising:
   a housing having a central plane and an opening at its forward end for receiving harvested material and an opening adjacent its aft end for discharging cut material;
   a fixed laterally extending shear bar positioned across the forward opening of said housing;
   a rotary cutter having helical cutter blades formed with leading edges and journaled for rotation about an axis transverse to the housing and parallel to said fixed shear bar for cutting and passing rearwardly material passing into and through the forward end of said housing and between the cutter and bar; and
   an auger journaled for rotation about a fore and aft axis, offset from said central plane, for receiving cut material and passing it toward the aft opening of said housing for discharge;
   said helical cutter blades being formed to force material in the direction of the offset and said auger being so formed and rotated that the cut material passing from the cutter blades is thrown toward the feed side of said auger.

2. Apparatus as in claim 1 wherein said auger rotates clockwise as viewed from the aft end of said housing and the leading edges of the helical cutter blades are so formed that the left-hand end of each blade leads the right end past the fixed shear bar as viewed from the aft end of the housing, said auger having right-handed flights.

3. Apparatus as in claim 1 further comprising a fore and aft extending trough receiving said auger and having one generally vertical wall extending upward from the feed side of the auger so that cut material is discharged against said wall, and
   an upper cover extending between the side walls of said auger trough and having a gradual slope extending from the aft end of the auger trough upward to a point adjacent and generally in alignment with the axis of rotation of said rotary cutter.

4. Apparatus as in claim 1 further comprising:
   a generally cylindrical chamber positioned adjacent the aft end of said housing and having an inlet adjacent the aft end of said auger, for receiving cut material, and a tangentially directed outlet; and
   a plurality of paddles rotatably journaled in said cylindrical housing and about an axis transverse to said housing for sweeping cut material from said inlet up to and out of said tangentially directed outlet,
   said housing comprising first and second generally parallel side walls and an intermediate wall, said first and intermediate walls forming side walls of said cylindrical chamber.

5. Apparatus as in claim 4 further comprising a fore and aft extending trough in which said auger is journaled, said auger trough being defined by said intermediate and said second wall, said second wall extending upward along the feed side of said auger whereby cut material is discharged against said second side wall and falls into the feed side of said auger, and
   a top cover extending between said intermediate wall and said second wall and gradually sloping upward from a point adjacent the aft end of said auger trough to a point adjacent to and generally in alignment with the axis of rotation of said rotary cutter.

6. Apparatus as in claim 5 wherein said auger rotates in a clockwise direction as viewed from the aft end of said housing and helical cutter blades are so formed that the left edge of the blades leads the right edge of the blades past the fixed shear bar as viewed from the aft end of said housing, said auger having right hand helical flights.

* * * * *